United States Patent
Anderson et al.

(10) Patent No.: US 7,223,168 B2
(45) Date of Patent: May 29, 2007

(54) ADJUSTABLE CROP RESIDUE FLOW DISTRIBUTOR FOR A VERTICAL SPREADER OF AN AGRICULTURAL COMBINE

(75) Inventors: Brian J. Anderson, Yorkville, IL (US); Luc Yde, Oost Vlaanderen (BE); Eddy Lammerant, Nieuwpoort (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/194,844

(22) Filed: Aug. 1, 2005

(65) Prior Publication Data

US 2007/0026912 A1    Feb. 1, 2007

(51) Int. Cl.
    *A01F 12/30*    (2006.01)
(52) U.S. Cl. .................................... 460/111
(58) Field of Classification Search ............ 460/111, 460/79, 112, 39, 44, 78, 901, 71, 63, 66; 241/186.3, 243; 56/503
    See application file for complete search history.

(56) References Cited

U.S. PATENT DOCUMENTS

| | | | |
|---|---|---|---|
| 4,646,757 A | 3/1987 | Schmitt et al. | 460/112 |
| 4,921,469 A * | 5/1990 | Scharf | 460/10 |
| 5,421,777 A | 6/1995 | Strubbe et al. | 460/13 |
| 5,556,042 A | 9/1996 | Roberg | 241/101.76 |
| 5,928,079 A | 7/1999 | Roberg | 460/83 |
| 5,976,011 A | 11/1999 | Hartman | 460/111 |
| 6,238,286 B1 * | 5/2001 | Aubry et al. | 460/111 |
| 6,416,405 B1 * | 7/2002 | Niermann | 460/79 |
| 6,663,485 B2 | 12/2003 | Niermann | 460/79 |
| 6,719,627 B2 * | 4/2004 | Wolters et al. | 460/111 |
| 6,736,721 B2 | 5/2004 | Niermann | 460/112 |
| 2003/0109293 A1 | 6/2003 | Wolters | 460/111 |
| 2004/0092298 A1 | 5/2004 | Holmen | 241/101.76 |

FOREIGN PATENT DOCUMENTS

| | | |
|---|---|---|
| EP | 0212337 | 3/1987 |
| EP | 0104622 | 4/2004 |

* cited by examiner

*Primary Examiner*—Árpád Fábián Kovács
(74) *Attorney, Agent, or Firm*—Michael G. Harms; John William Stader; Stephen A. Bucchiancri

(57) ABSTRACT

An adjustable flow distributor for a vertical spreader operable for discharging a flow of straw and other crop residue in a sideward direction for deposition over a field, the flow distributor including a metering edge and the adjustability allowing positioning the metering edge for tailoring or adjusting a pattern of discharged flow of crop residue, for instance, so as to be better and more evenly distributed over a swath of an agricultural field from which the crop was harvested, particularly a region of the swatch in proximity to the spreader and/or chopper.

7 Claims, 10 Drawing Sheets

ADJUSTABLE CROP RESIDUE FLOW DISTRIBUTOR FOR A VERTICAL SPREADER OF AN AGRICULTURAL COMBINE

TECHNICAL FIELD

This invention relates generally to an agricultural combine, and more particularly, to an adjustable flow distributor for a vertical spreader operable for discharging a flow of straw and other crop residue in a sideward direction for deposition over a field, the flow distributor including at least one metering edge which, in combination with at least fore and aft adjustability of the distributor allowing adjusting or tailoring a pattern of crop residue flow therefrom, for instance, so as to be better and more evenly distribute the flow side to side over a swath of an agricultural field from which the crop was harvested.

BACKGROUND ART

Currently, combines typically include a crop residue spreader for disposing of straw and other residue separated from the harvested crop onto the field from which the crop was harvested. In addition, some combines have a chaff spreader for spreading chaff residue separated from the grain by the cleaning apparatus or system onto the crop field. In many instances it is desirable for the straw, chaff and other residue to be spread as evenly as possible over the width or swath of that section of the field over which the combine has just passed and harvested the crop from, to avoid problems resulting from uneven spreading, such as, but not limited to, difficulty in passage of fall tillage tools through residue clumps or thick areas; uneven insulation of the field resulting in uneven field warming and thawing and crop emergence during the following planting season; and increased rodent and insect habitat. In some instances, it is also desirable to have an ability to adjust the spreading to compensate for crop type, varying moisture and weather conditions, such as wind and the like, and also combine header width.

Although various crop residue spreaders are known which can propel residue a distance equal to about one half the width of a typical combine header, many suffer from shortcomings, including a tendency to provide uneven crop residue distribution or coverage in the side to side direction over the swath. More particularly, for a vertical spreader, that is, a spreader utilizing one or more rotary impellers or other elements rotatable about a generally horizontal axis, or an axis oriented or tilted at a small acute angle to horizontal, and configured for directing a flow or flows of crop residue sidewardly, it has been found that the resultant coverage has a tendency to be uneven in the sideward direction, for instance, typically thicker toward the outer regions or sides of the swath, and thinner or less uniform closer to the center of the swath.

Thus, what is sought is a crop residue flow distributor for the discharge outlet of a vertical crop residue spreader, having a capability to adjustably distribute or guide portions of a discharged flow of crop residue for achieving a desired pattern of the distributed residue, which can include particularly, more even distribution side to side over a region of an agricultural field from which the crop was harvested, to achieve the advantages, and avoid the shortcomings and problems of the prior art devices, discussed above.

SUMMARY OF THE INVENTION

What is disclosed is an adjustable crop residue flow distributor for a vertical crop residue spreader of an agricultural combine which overcomes many of the problems discussed above.

According to a preferred aspect of the invention, the flow distributor includes a flow guide having a first end portion, a second end portion opposite the first end portion, and opposite fore and aft edges extending between the first and second end portions defining a crop residue flow surface extending therebetween. The flow guide is supported on a combine, preferably directly on the spreader, with at least the first end portion disposed beneath a generally downwardly facing discharge opening of the spreader such that the crop residue flow surface is located generally beneath the opening and extends sidewardly outwardly relatively thereto to the second end portion of the flow guide, for carrying and guiding a flow of crop residue discharged from the opening so as to flow sidewardly and outwardly from the spreader for distribution over a field.

Importantly, the flow distributor includes an adjusting mechanism operable for moving the flow guide at least fore and aft relative to the discharge opening, such that at least one of the fore and aft edges is disposed for changing a pattern of crop residue distribution over a field, including optionally as desired or required, for allowing a desired amount of the flow to bypass the flow guide so as to be distributed on a region of a field directly below and in close proximity to the spreader, for instance, so as to provide more even and uniform coverage side to side over a swath of a field, including the region beneath the spreader itself.

According to another preferred aspect of the invention, the adjusting mechanism is operable for adjustably moving the flow guide in the fore and aft directions to position at least one of the fore and aft edges of the flow guide for metering a portion of the flow so as to be distributed on a region of a field in an altered manner.

According to still another preferred aspect of the invention, at least one of the fore and aft edges of the flow guide used for metering the flow can have a special shape, such as a tapered shape, for distributing portions of a crop residue flow thereover at different sideward distances from the spreader, as a function of a fore and aft location of the edge.

According to still further preferred aspects of the invention, the crop residue flow surface of the flow guide can have an upwardly and sidewardly outwardly facing concave curved shape, so as to be capable of guiding a flow of crop material discharged downwardly from the discharge opening sidewardly and outwardly therefrom. The flow guide can also be supported so as to be movable upwardly and downwardly relative to the discharge opening, for effecting changes in the crop residue distribution pattern, and the adjusting mechanism can include an actuator remotely controllable for moving the flow guide in the fore and aft directions, and the upward and downward movement can also be remotely controlled by an actuator, as desired.

DETAILED DESCRIPTION OF THE INVENTION

Figure 1:
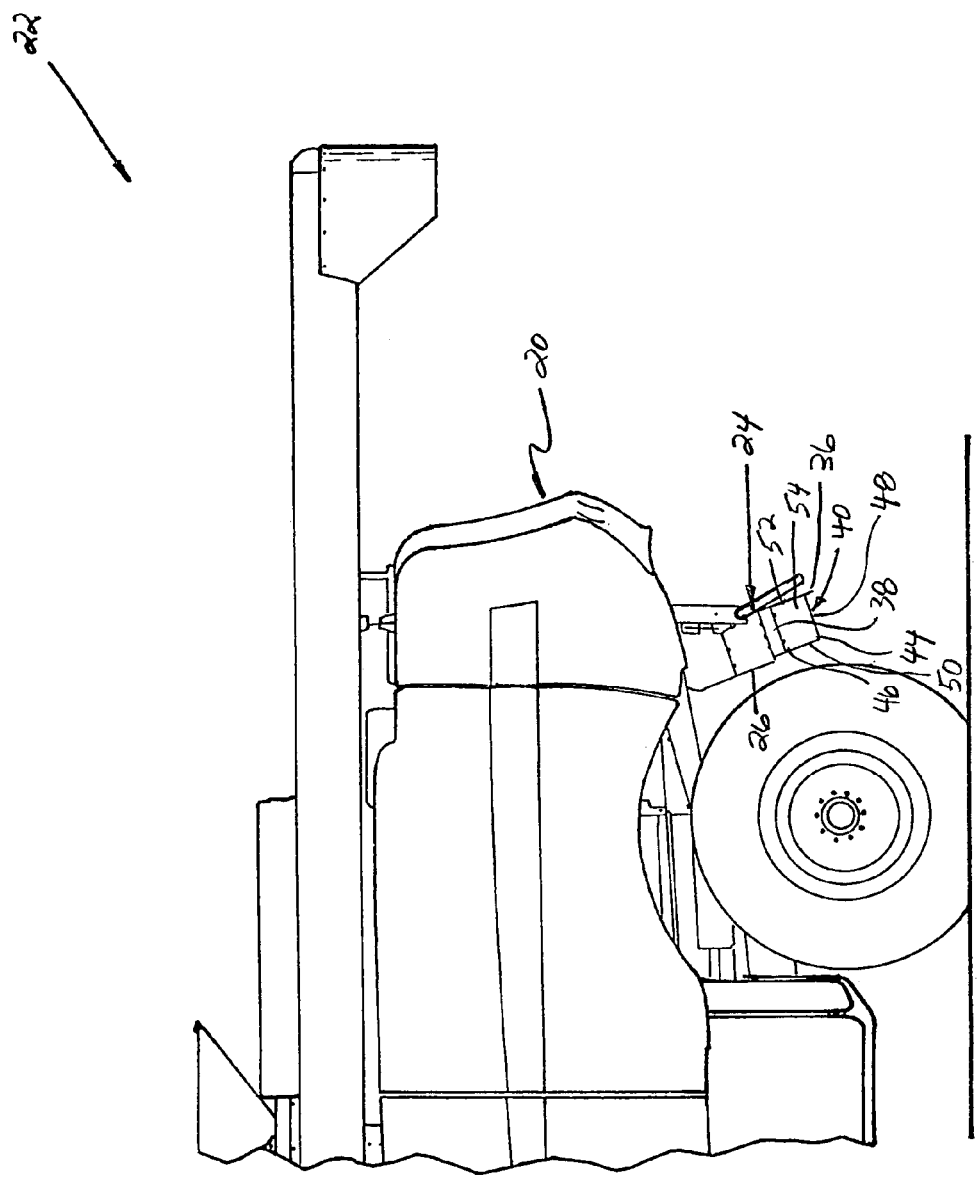
FIG. 1 is a simplified, fragmentary side view of the rear end of an agricultural combine including a pair of adjustable crop residue flow distributors for a vertical spreader of the combine.

Referring now to the drawings, wherein preferred embodiments of the present invention are shown, in FIG. 1, a rear end 20 of a self-propelled agricultural combine 22 is shown, including a vertical crop residue spreader 24 operable for spreading straw, stalks, and other crop residue and trash that has been separated from the grain of the crops by a threshing mechanism (not shown) of combine 22 located forwardly of rear end 20. The straw, stalks and the like are propelled rearwardly by rotating beaters or the like (also not shown) from the threshing mechanism and downwardly through a rear cavity of combine 22 to vertical spreader 24 for spreading and optionally chopping thereby, all in the well known manner.

Figure 2:
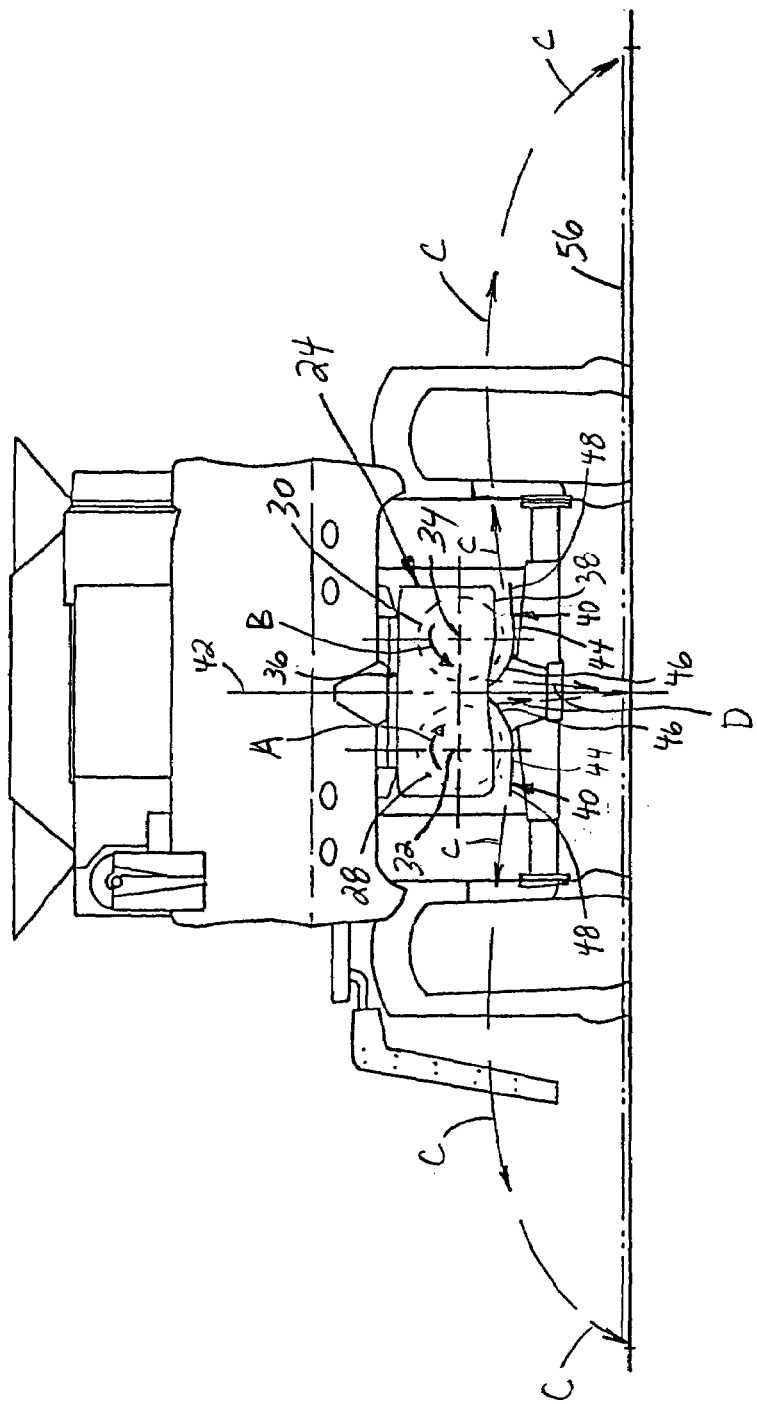
FIG. 2 is a rear view of the combine, showing the spreader and adjustable flow distributors.

Referring also to FIG. 2, spreader 24 includes a housing 26 of sheet metal or other construction containing a pair of side by side rotary impellers 28 and 30 rotatable in opposite predetermined rotational directions, denoted by arrows A and B, about a pair of rotational axis 32 and 34, respectively. Here, it should be understood that impellers 28 and 30 are representative of a variety of rotary devices that can be utilized in a spreader of this type, such as a rotor having fixed blades, or carrying a plurality of knives, such as flail knives, for propelling the crop residue outwardly from the housing. The spreader can additionally optionally include a rank of fixed knives through which the rotating knives pass for chopping crop residue.

Impellers 28 and 30 are rotated by suitable driving elements, such as by conventionally constructed and operable hydraulic motors powered by pressurized hydraulic fluid received from a pump (not shown) of combine 22, an electric motor, belt, or the like, again in the well known manner. Rotational axes 32 and 34 extend at least generally in the fore and aft directions, that is, generally forwardly and rearwardly with respect to combine 22, and are generally horizontal or oriented at a small acute angle to horizontal, depending on an orientation or tilt of spreader 24 on combine 22, which can be optionally variable and adjustable in the well known manner.

Housing 26 of spreader 24 includes spaced, opposed radial side walls, and a rear wall 36 extending therebetween across the width of spreader 24, defining an internal cavity containing impellers 28 and 30. Housing 26 defines a forwardly and upwardly facing inlet opening for receiving the residue flow from the threshing system, and a downwardly facing discharge opening 38, through which the residue is propelled downwardly and in opposite sideward directions by impellers 28 and 30, respectively.

Residue flow within housing 26 is propelled by rotating impellers 28 and 30 in the predetermined rotational directions A and B along circumferential flow paths, at speeds equal to or increased relative to the inlet speed of the residue flow such that the residue does not build up at the inlet and is expelled from housing 18 through discharge opening 38 at a corresponding speed. In the instance wherein spreader 24 is solely used for spreading, the speed imparted to the residue by impellers 28 and 30 will be sufficient for airborne travel of the residue a substantial sideward distance from combine 22 for deposition on regions of the agricultural field over which combine 22 has just traveled and from which the crops have been harvested.

As noted above, it is desired in many instances to distribute the crop residue discharged by impellers 28 and 30 substantially evenly over the width of a swath of the field from which the crop has just been harvested by combine 22, which width is typically defined by the overall width of a harvesting head of combine 22, which width can be as much as 30 to 40 feet in the instance of some heads currently in use. Thus, it is desirable that rotary impellers 28 and 30 have the capability to expel or propel crop residue a distance of up to about 20 feet or so therefrom, corresponding to one-half the width of the header used on combine 22, and possibly farther as combine headers of greater width are introduced. Impellers 28 and 30 can be suitably configured and rotated at a sufficient velocity for propelling crop residue such as, but not limited to, chopped straw, stems and branches, cobs and the like, the required distance of up to one-half the width of a header currently being used, by a conventional hydraulic motor or any other suitable driver as mentioned above. The problem to be currently overcome, however, is distributing the crop residue substantially evenly over this distance of up to about 20 feet or so particularly including in the region of a swath directly beneath spreader 24.

Referring also to FIGS. 3, 4, 5, 6, 7 and 8, to overcome the problem set forth above, spreader 24 includes a pair of adjustable crop residue flow distributors 40, constructed and operable according to the teachings of the present invention. Crop residue flow distributors 40 are mirror images of one another, and thus can be described and discussed singularly when appropriate, and are positioned for use in cooperation with respective impellers 28 and 30 (FIG. 2) of spreader 24 for receiving and carrying flows of crop residue discharged through discharge opening 38, in opposite sideward directions outwardly away from spreader 24, for distribution in a desired pattern on sides of a just harvested swath of a field over which combine 22 is moving. Here, it should be understood that by the term "sideward" what is meant is a direction transverse the fore and aft directions, the term "sidewardly outwardly" thus meaning sidewardly away from a center line 42 (FIG. 2) of spreader 24, the term "sidewardly inwardly" meaning closer to center line 42.

Each of flow distributors 40 preferably includes a flow guide of suitable, rigid construction, such as of sheet metal, or plastics, having a first end portion 46 supported adjacent to discharge opening 38 in the vicinity of center line 42 in a position so as to receive at least a portion of the crop residue flow discharged through opening 38. Flow guide 44 includes a second end portion 48 opposite first end portion 46, and a fore edge 50 and an opposite aft edge 52 extending between first and second end portions 46 and 48 defining a crop residue flow surface 54 extending between end portions 46 and 48 for guiding and carrying the received crop residue flow sidewardly outwardly away from spreader 24 and distributing the crop residue, illustrated by strings of oppositely directed arrows C and downwardly directed arrows D in FIG. 2, for distribution in a pattern on a field, represented by dotted line 56 in FIG. 2, having desired characteristics, such as uniformity and evenness of crop residue distribution.

Flow guide 44 is additionally preferably elongate in the sideward direction, and crop residue flow surface 54 preferably has an upwardly directed concave shape. Additionally, at least aft edge 52 includes a tapered portion 58 which extends diagonally forwardly and sidewardly outward toward second end portion 48, such that a portion of crop residue flow surface 54 adjacent to second end portion 48 of the flow guide, is reduced in fore and aft extent, compared to a portion of surface 54 adjacent to first end portion 46.

Figure 3:
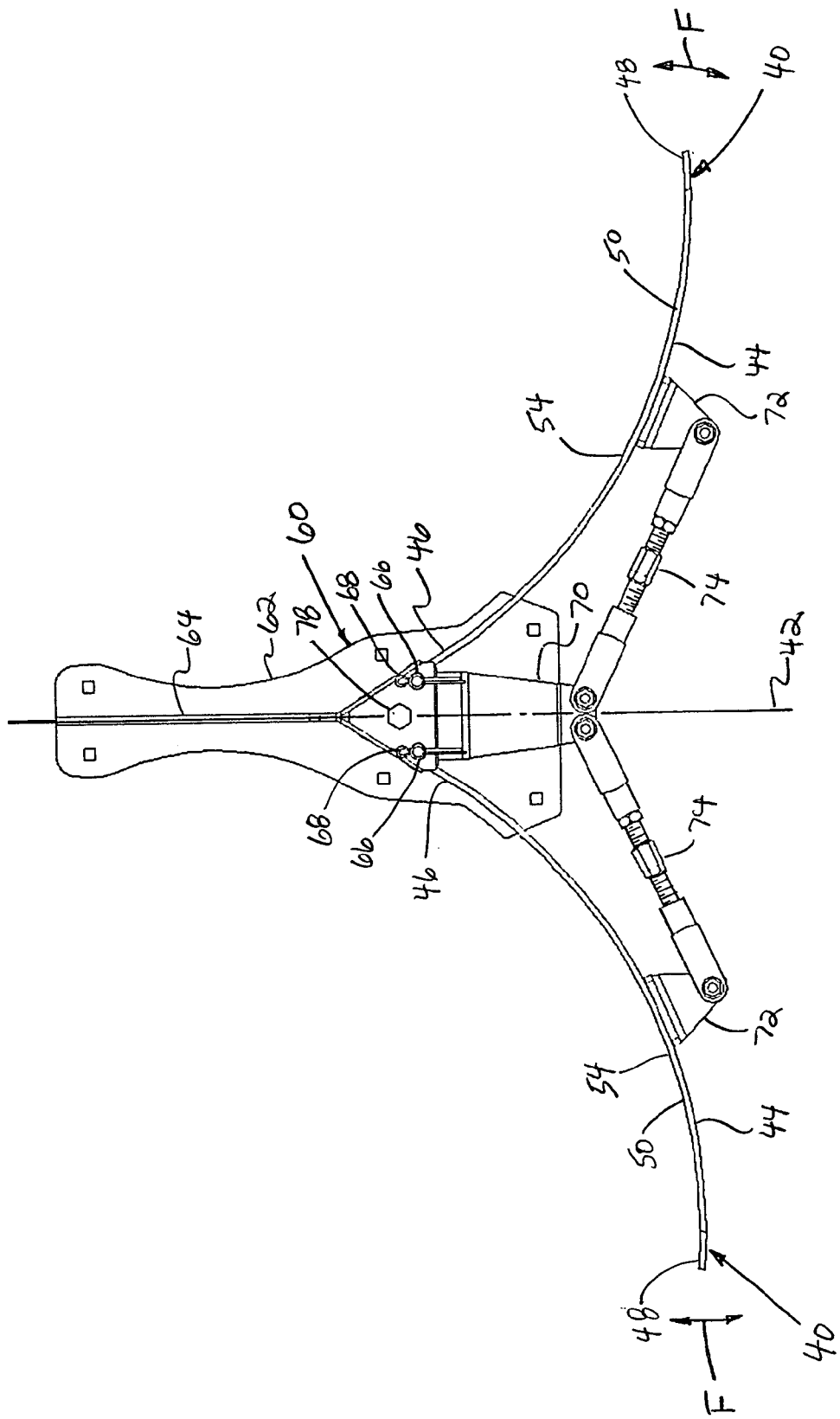
FIG. 3 is an enlarged front view of the adjustable flow distributors.
Figure 4:
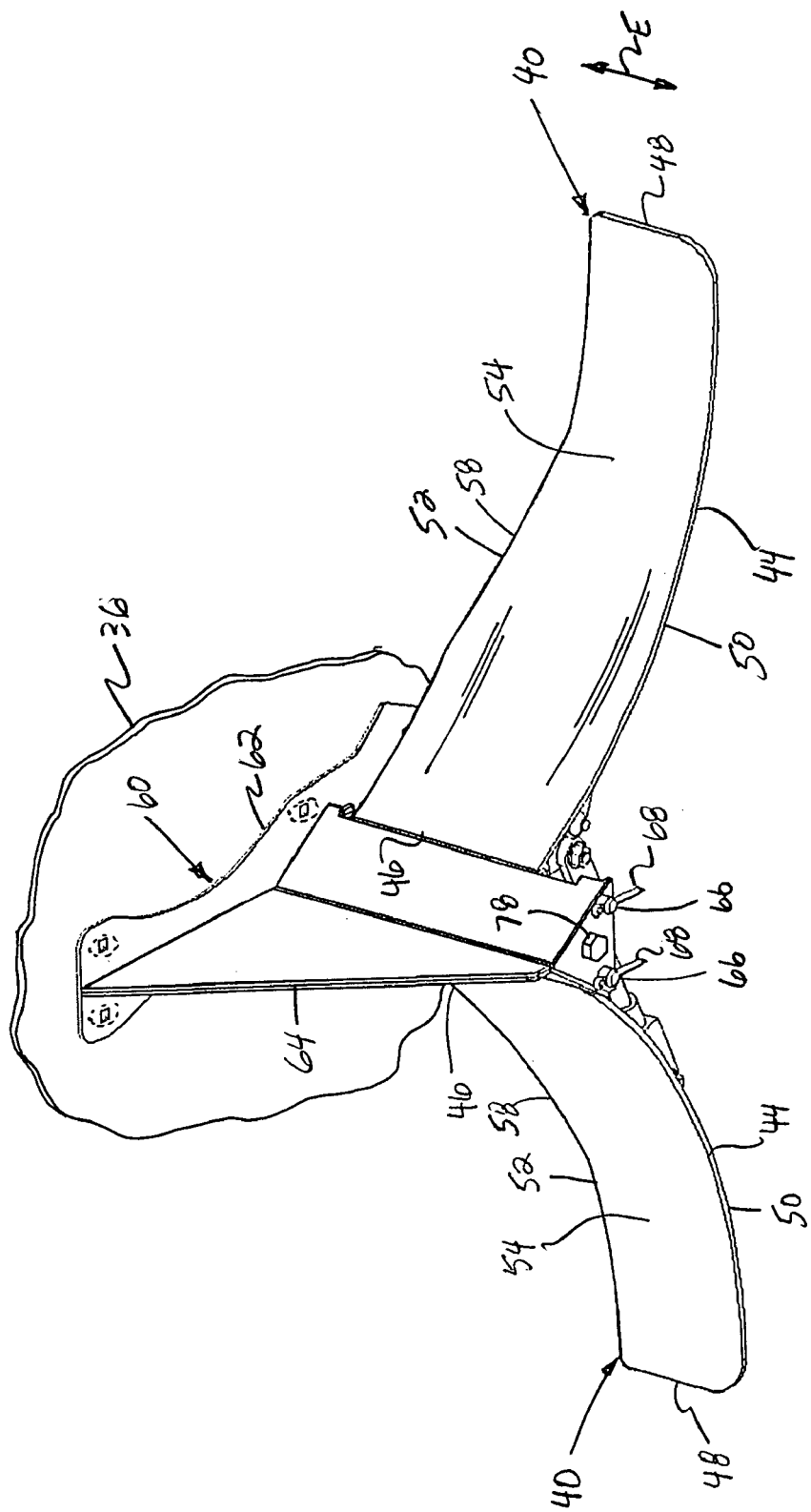
FIG. 4 is a perspective view of the flow distributors, illustrating mounting thereof on a rear wall of a housing of the spreader.
Figure 5:
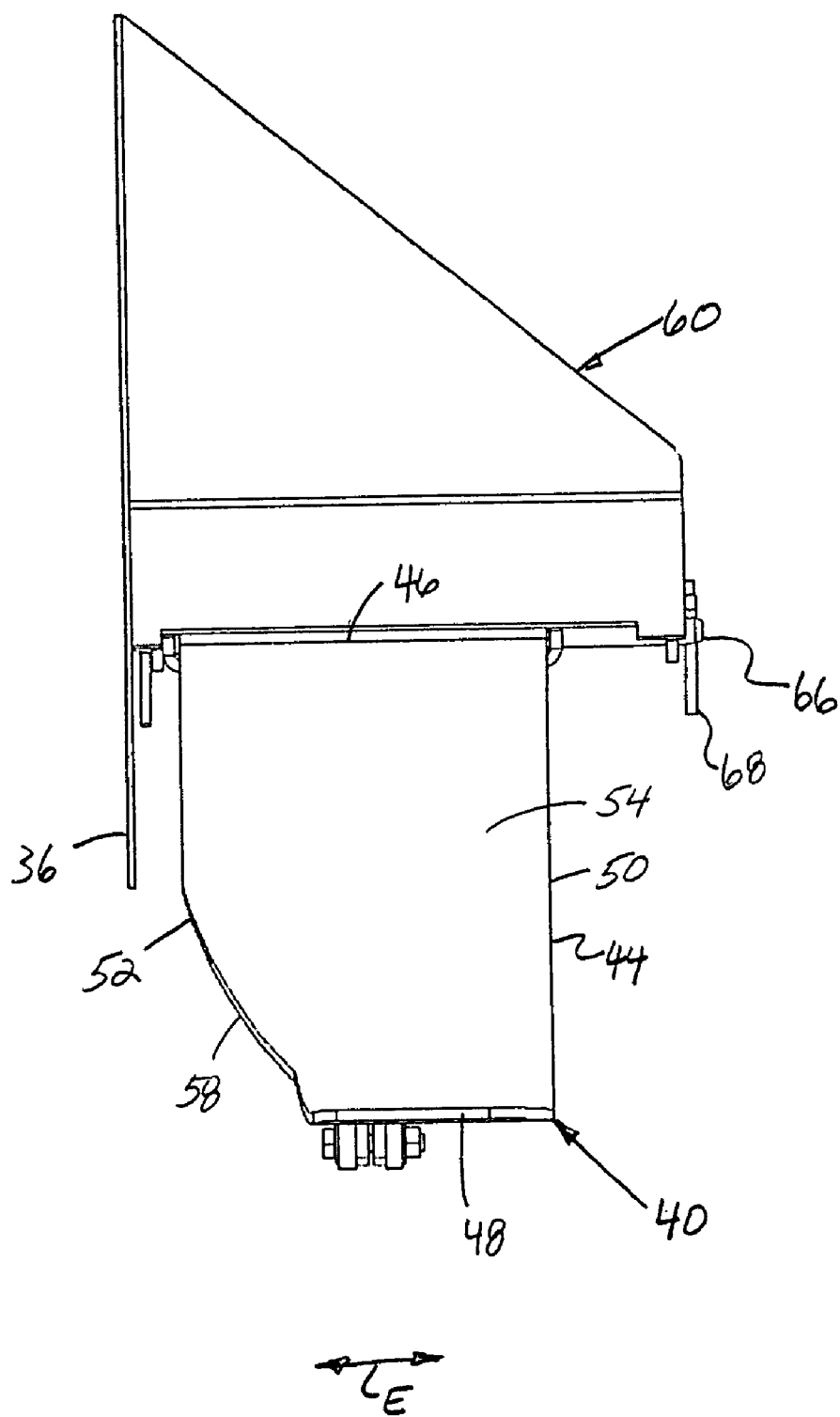
FIG. 5 is a right side view of the flow distributors mounted on the rear wall of the spreader.
Figure 7:
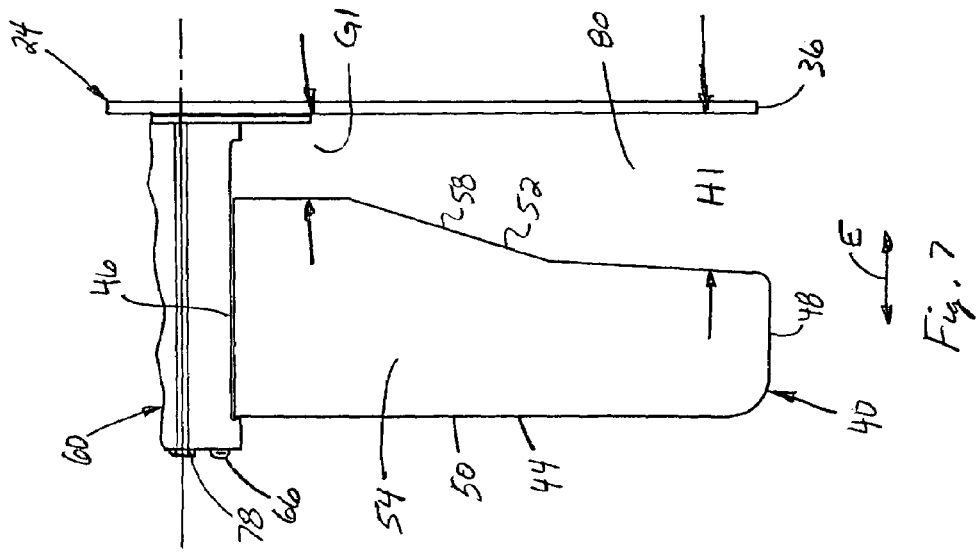
FIG. 7 is another fragmentary left side view of the spreader, showing the flow distributor in another fore and aft position.

Referring more particularly to FIGS. 3 and 4, each of flow guides 44 is preferably supported on combine 22, and more preferably on spreader 24, by adjustable support structure 60. Support structure 60 preferably includes a rear plate 62 mountable in a suitable manner, such as using bolts or other fasteners, to a central region of rear wall 36 of spreader 24, so as to be at least generally aligned with center line 42 of spreader 24. Support structure 60 includes a center flow divider 64 connected to plate 62 and extending forwardly therefrom, so as to be disposed between impellers 28 and 30 for dividing crop residue flow therebetween, and for supporting flow guides 44 for fore and aft movement relative to structure 60, as denoted by arrows E in FIGS. 4, 5, 6, 7 and 8, and also upward and downward pivotal movement relative thereto, as denoted by arrows F in FIG. 3. The first end portion 46 of each of flow guides 44 is connected to support structure 60 by a fore and aft extending pivot pin 66 retained in position by a cotter pin 68. Additionally, pins 66 support a center bracket 70 which extends downwardly from divider 64 and is movable in the fore and aft directions with flow guides 44. Each of flow guides 44 includes a bracket 72 on an underside thereof about midway between end portions 46 and 48. A pair of turn buckles 74 are pivotally connected between center bracket 70 and brackets 72 on flow guides 44, respectively, and are individually adjustable for varying the position of the respective flow guides 44 upwardly and downwardly, as desired or required for achieving a particular crop residue distribution pattern, particularly the overall width thereof. Center bracket 70 additionally includes a threaded nut 76 fixed on a rear end thereof, which threadedly receives an elongate threaded member 78 supported for rotation on support structure 60, for jointly moving flow guides 44 in the fore and aft directions, denoted by arrows E, by the rotation of threaded member 78, in the manner of a jack screw. That is, by rotation of threaded member 78 in a first rotational direction, simultaneous movement of both flow guides 44 in a first of the fore and aft directions is achieved, and by rotation of member 78 in an opposite rotational direction, simultaneous movement of flow guides 44 in an opposite one of the fore and aft directions is achieved. Two representative fore and aft positions of a flow guide 44 are illustrated in FIGS. 6 and 7, it being contemplated that the flow guides 44 are positionable at any of a range of positions between those shown in FIGS. 6 and 7.

An important advantage of the ability to adjustably position flow guides 44 through a range of fore and aft positions, is the ability to vary the fore and aft position of aft edge 52 in relation to flow from spreader 24, and, more particularly, a position of tapered portion 58 of aft edge in the flow, which functions as a metering edge for adjusting a pattern of distribution of the flow over a field. The adjustability of tapered portion 58 has been found to be advantageous, because, the more aft the location thereof, the greater is the amount of crop residue which will be distributed a farther distance from the spreader.

Additionally, aft edge 52 can serve as a divider of flow discharged from spreader 24. That is, edge 52 can be positioned such that a portion of the flow will impinge surface 54 of flow guide 44 in the vicinity of first end portion 46 thereof, and be guided and carried thereby sidewardly outwardly over second end portion 48 for subsequent distribution over regions of a field sidewardly beyond the flow guide, and portions can pass through a space 80 between aft edge 52 and rear wall 36 so as to effectively bypass the flow guide and flow more downwardly for distribution over regions of a field beneath and closer to spreader 24. As a result, aft edge 52 and the fore and aft position of flow guide 44 serves as an adjustable metering apparatus for distribution of crop residue over a field.

Figure 6:
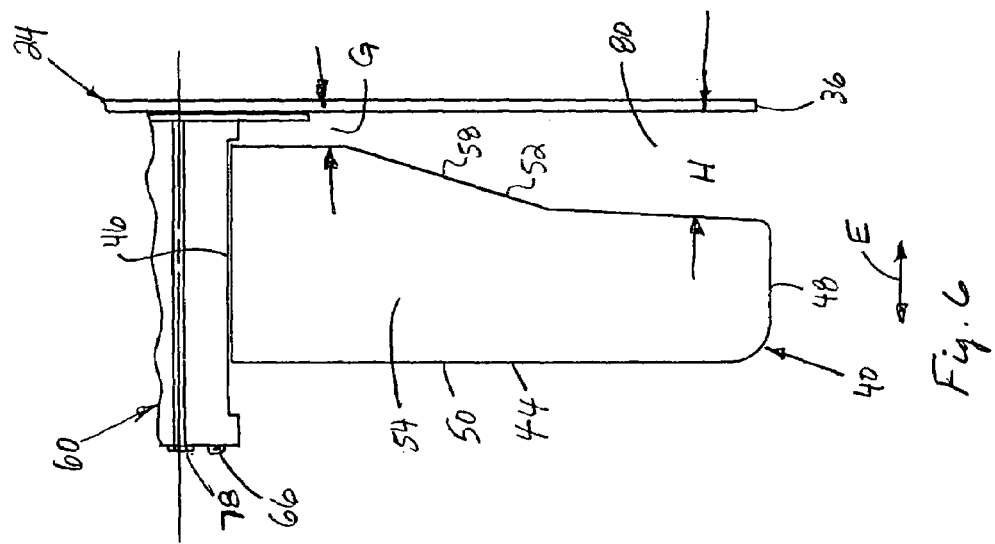
FIG. 6 is a fragmentary left side view of the spreader, illustrating the flow distributor thereof in one fore and aft position.
Figure 8:
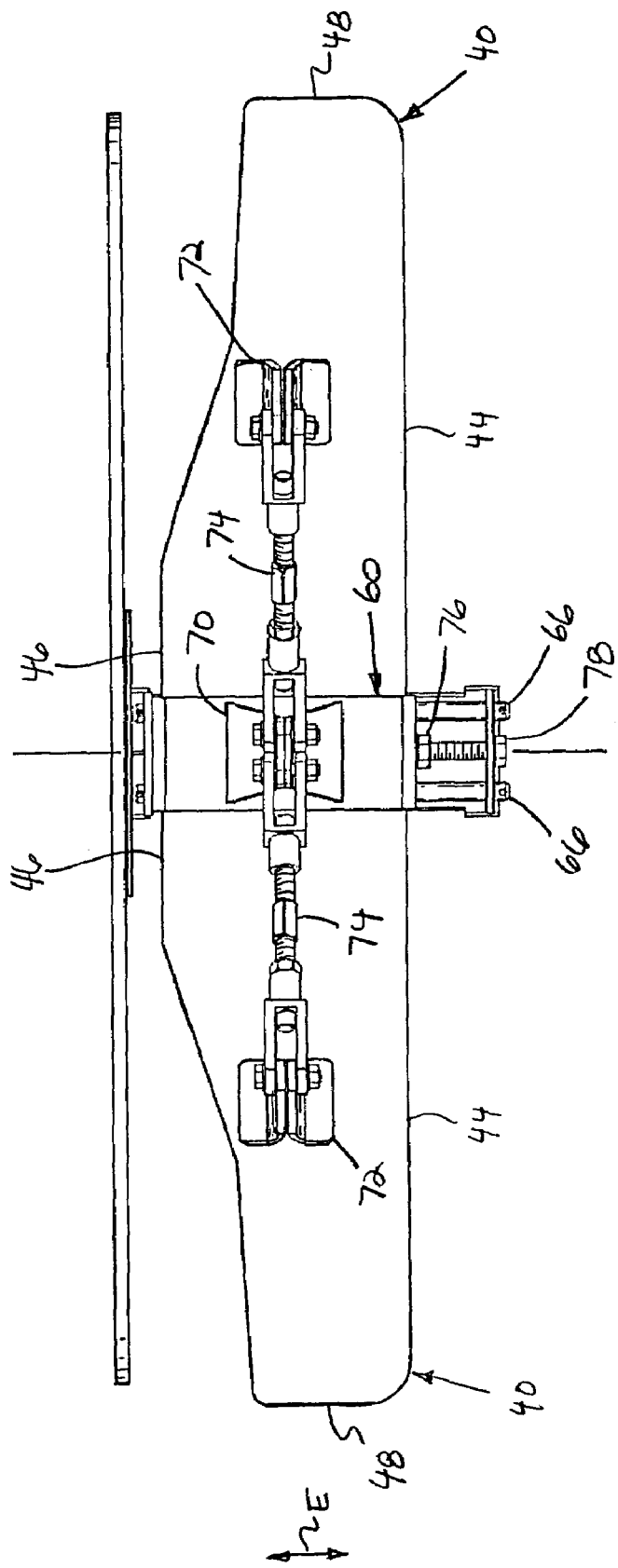
FIG. 8 is a bottom view of the flow distributors.

More particularly in the latter regard, in FIG. 6, a fore and aft extent G of a portion of space 80 between first end portion 46 of flow guide 44 and rear wall 36 of spreader 24 is shown, and a fore and aft extent H of space 80 between second end portion 48 and rear wall 36, which is greater than extent G, is shown. In FIG. 7, a fore and aft extent G1 is shown between first end portion 46 and rear wall 36, and a fore and aft extent H1 between second end portion 48 and wall 36 is shown, extents G1 and H1 being greater than extents G and H, reflecting the different fore and aft positions of flow guide 44 in the two figures. Thus, it should be apparent that by enlarging or decreasing space 80, different distribution characteristics can be achieved, particularly in the area beneath spreader 24.

Figure 9:
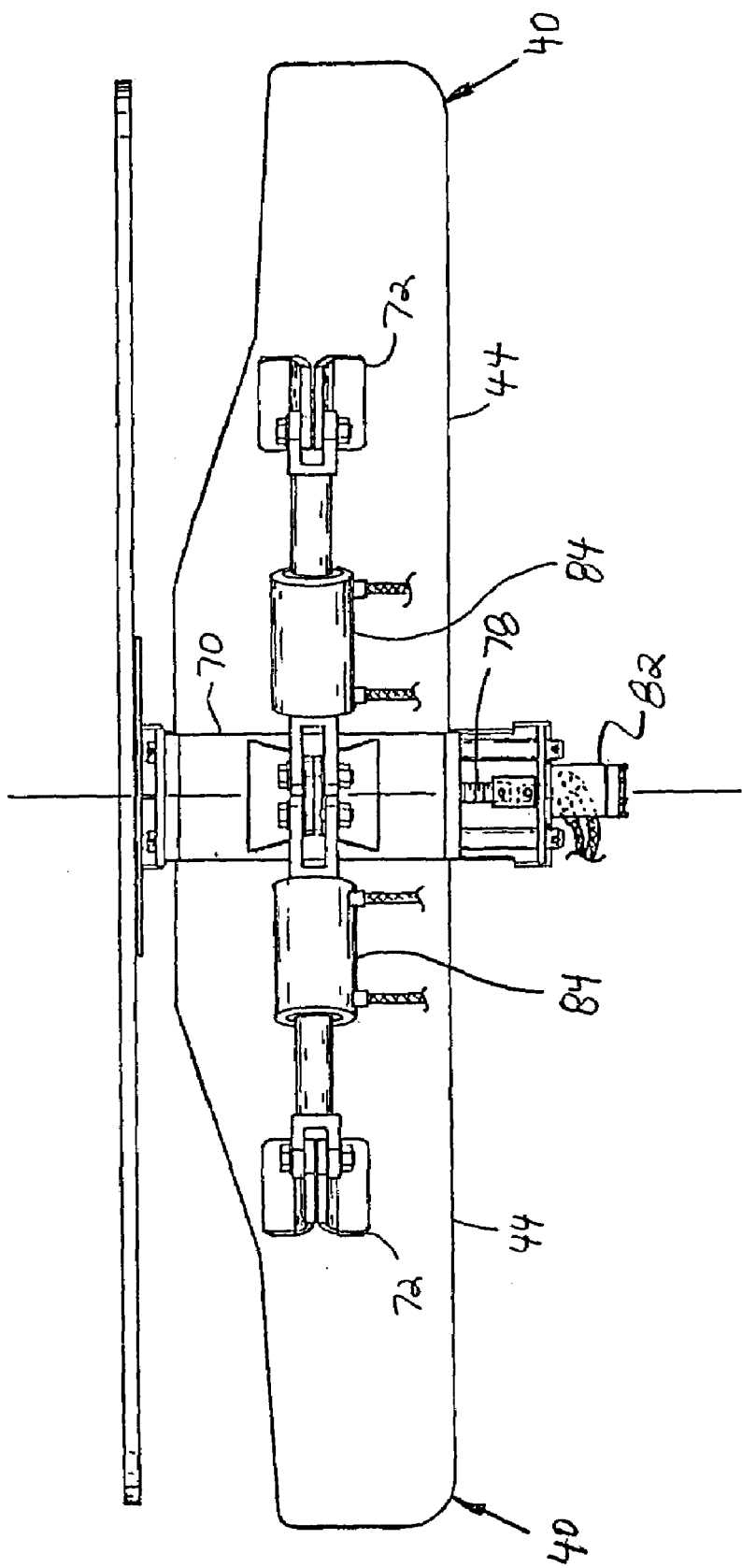
FIG. 9 is a bottom view of the flow distributors of the invention, showing an adjusting mechanism including a remotely controllable actuator, and remotely controllable actuators for controlling upward and downward movement of flow guides of the distributors.

Referring also to FIG. 9, a remotely controllable actuator 82 is shown in connection with threaded member 78, for effecting rotation thereof for achieving a desired or required fore and aft position of flow guides 44 of flow distributors. Remotely controllable actuators 84 are shown in connection between center bracket 70 and brackets 72 on flow guides 44, in place of turn buckles 74, for effecting upward and downward movements of the flow guides, either independently, or jointly. Actuators 82 and 84 can be any suitable commercially available devices, such as, but not limited to, electric or other motors, cylinders, solenoids, or the like, and can be controlled from a suitable location such as an operator cab of the combine.

Figure 10:
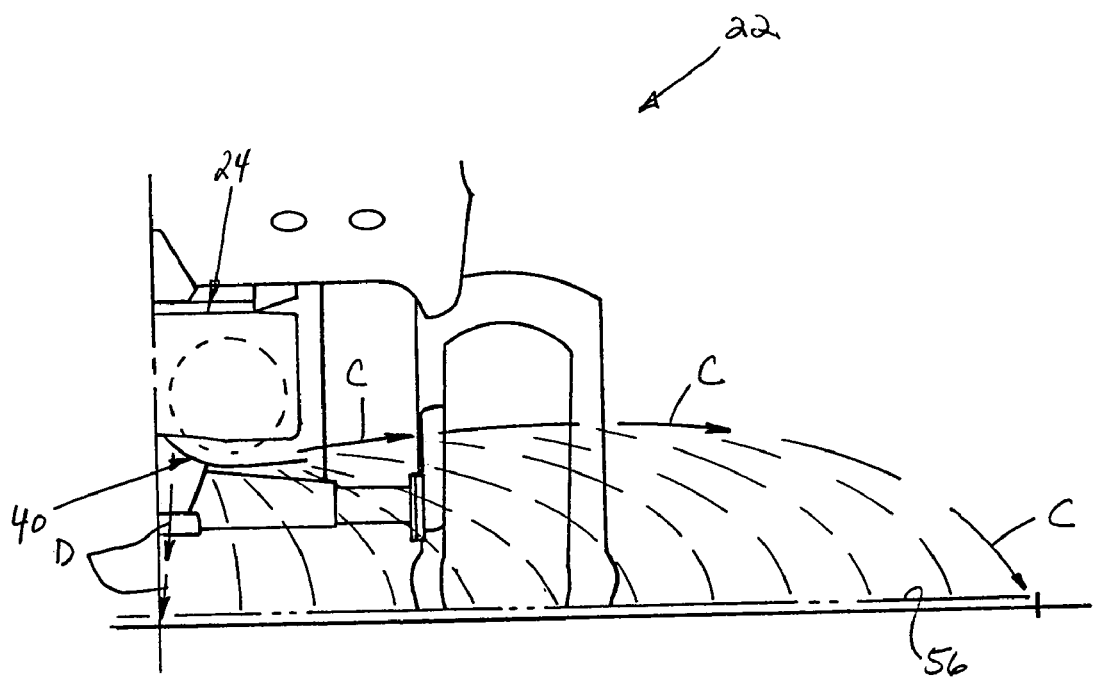
FIG. 10 is a simplified schematic rear view of a right rear end of the combine and spreader, showing a representative pattern of crop residue distribution by the flow distributor on that side of the spreader.
Figure 11:
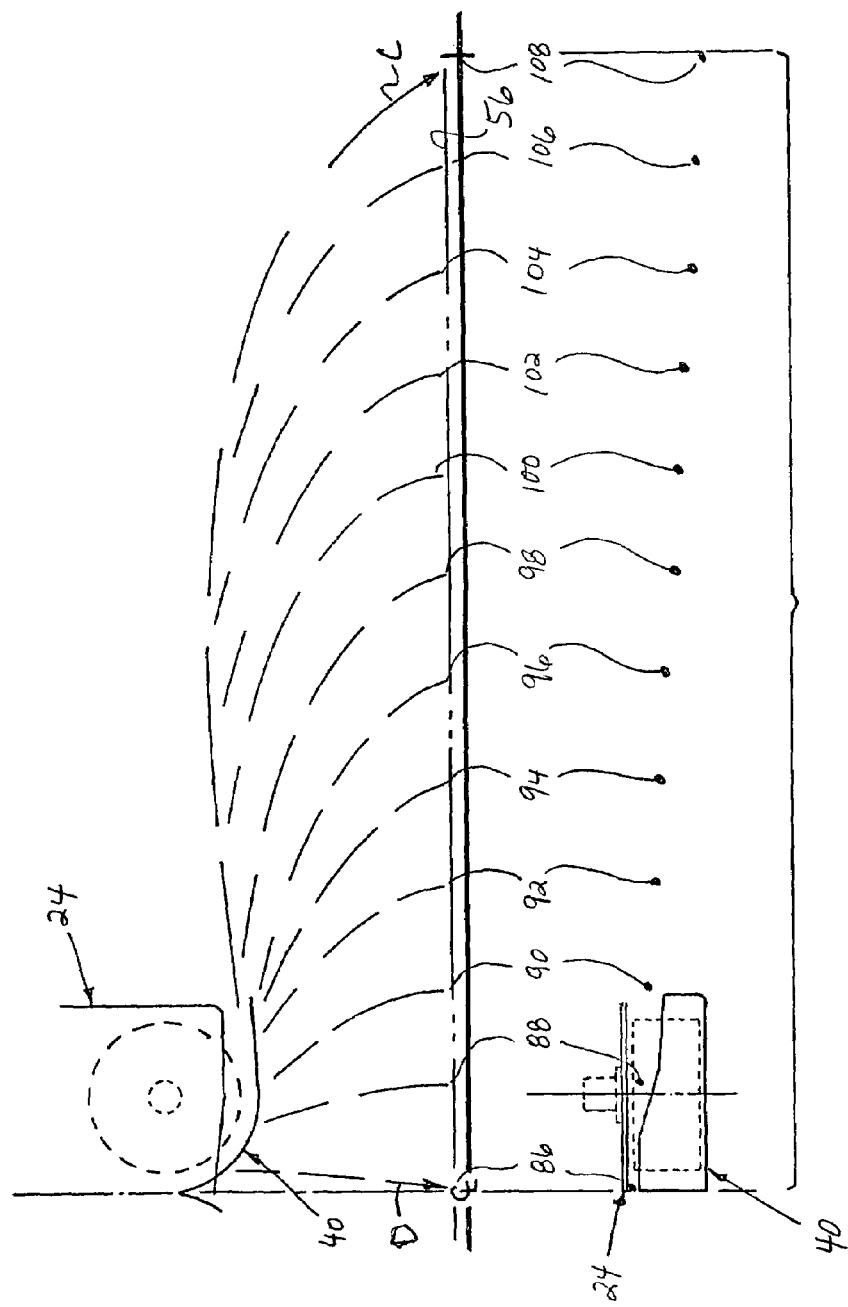
FIG. 11 is a simplified schematic rear view of a right rear end of the spreader and flow distributor, in combination with a bottom view thereof, diagrammatically illustrating characteristics of a pattern of crop residue flow distribution therefrom.

FIGS. 10 and 11 illustrate crop residue distribution patterns 56 which are possible using a flow distributor 40 in cooperation with a vertical spreader such as spreader 24 on combine 22. Again, as discussed in reference to FIG. 2, a substantially even or uniform crop residue distribution pattern, denoted by line 56, can be achieved as between flows C and D, by making required adjustments of the position of distributor 40 in the above discussed manner. The dots 86, 88, 90, 92, 94, 96, 98, 100, 102, 104, 106 and 108 in FIG. 11 illustrate approximate locations along pattern 56 where crop residue flowing along the correspondingly numbered lines will be distributed on a field.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A fore and aft adjustable flow distributor for a vertical crop residue spreader of an agricultural combine, comprising:
   a flow guide having a first end portion, a second end portion opposite the first end portion, and opposite fore and aft edges extending between the first and second end portions defining a crop residue flow surface extending therebetween, wherein the flow surface has an upwardly directed concave shape; and
   an adjustable support structure configured for supporting the flow guide with at least the first end portion thereof disposed beneath a downwardly facing portion of a discharge opening of the spreader and the second end portion extending sidewardly therefrom such that at least a portion of a flow of crop residue discharged through the opening will strike and flow sidewardly along the flow surface and sidewardly therefrom so as to be distributed thereby over a region of a field located sidewardly of the spreader, the support structure including an adjusting mechanism operable for moving the flow guide fore and aft in relation to the discharge opening for adjustably positioning at least one of the fore edge and the aft edge beneath the discharge opening, the at least one of the fore edge and the aft edge being shaped so as to alter a pattern of crop residue distribution over a field as a function of a fore and aft position of the edge beneath the discharge opening.

2. The flow distributor of claim 1, wherein at least a portion of the at least one of the fore edge and the aft edge has a fore and all extending tapered shape.

3. The flow distributor of claim 2, wherein the at least one of the fore edge and the aft edge comprises the aft edge and the tapered shape extends sidewardly outwardly and forwardly toward the second cud portion of the flow guide.

4. The flow distributor of claim 1, wherein the crop residue flow surface has an upwardly and sidewardly outwardly facing concave curved shape so as to be capable of guiding a flow of crop residue discharged downwardly from the discharge opening upwardly and sidewardly outwardly therefrom.

5. The flow distributor of claim 1, wherein at least one of the fore and aft edges of the flow guide is a metering edge which tapers toward the other of the edges in the sideward outward direction.

6. The flow distributor of claim 1, wherein the flow guide is supported such that at least the second end portion thereof is movable upwardly anti downwardly relative to the discharge opening.

7. The flow distributor of claim 1, wherein the adjusting mechanism includes an actuator remotely controllable for moving the flow guide in the fore and aft directions.

* * * * *